United States Patent
Claus et al.

(10) Patent No.: US 9,541,131 B2
(45) Date of Patent: Jan. 10, 2017

(54) METHOD FOR PRODUCING A ROLLING BEARING CAGE FOR AN AXIAL-RADIAL ROLLING BEARING AND AXIAL-RADIAL ROLLING BEARING

(71) Applicant: THYSSENKRUPP ROTHE ERDE GMBH, Dortmund (DE)

(72) Inventors: Wolfgang Claus, Lippetal (DE);
Reinhard Juergens, Warstein (DE);
Stefan Schnieder, Lippstadt (DE);
Joerg Rollmann, Lippstadt (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 0 days.

(21) Appl. No.: 14/381,885

(22) PCT Filed: Feb. 27, 2013

(86) PCT No.: PCT/EP2013/053948
§ 371 (c)(1),
(2) Date: Aug. 28, 2014

(87) PCT Pub. No.: WO2013/127865
PCT Pub. Date: Sep. 6, 2013

(65) Prior Publication Data
US 2015/0016762 A1    Jan. 15, 2015

(30) Foreign Application Priority Data
Feb. 29, 2012 (DE) .......................... 10 2012 101 651

(51) Int. Cl.
*F16C 33/46* (2006.01)
*F16C 33/48* (2006.01)
(Continued)

(52) U.S. Cl.
CPC .................. *F16C 33/48* (2013.01); *B05D 1/24* (2013.01); *F16C 19/381* (2013.01);
(Continued)

(58) Field of Classification Search
CPC ......... F16C 33/48; F16C 43/04; F16C 19/381; F16C 33/4629; F16C 19/386; F16C 33/565; F16C 33/513; B05D 1/24; B05D 3/0218; Y10T 29/49691
See application file for complete search history.

(56) References Cited

U.S. PATENT DOCUMENTS

| 1,224,346 A | 5/1917 | Wingquist |
| 3,573,953 A * | 4/1971 | Laulan ..................... B05D 1/24 |
| | | 118/425 |

(Continued)

FOREIGN PATENT DOCUMENTS

| DE | 1079901 B | 4/1960 |
| DE | 1577915 A1 | 3/1970 |

(Continued)

OTHER PUBLICATIONS

German Language International Search Report for International patent application No. PCT/EP2013/053948; mailing date Jun. 5, 2013.

(Continued)

*Primary Examiner* — Richard Chang
(74) *Attorney, Agent, or Firm* — thyssenkrupp North America, Inc.

(57) ABSTRACT

The invention relates to a method for producing a rolling bearing cage for a rolling bearing comprising at least one row of rolling elements. In the method according to the invention, a ring or a ring element made of a metallic solid material is provided and shaped by a forming process and/or a cutting, material-removing process into an annular or (Continued)

segmented main body of the rolling bearing cage. The main body has openings for receiving a respective rolling element, the main body being heated to a temperature above a minimum coating temperature for thermal coating with a thermoplastic material powder, wherein the main body is then immersed in a fluidized bed containing the thermoplastic material powder, wherein thermoplastic material powder adheres to the main body, melts and forms a contiguous coating while the main body is present in the fluidized bed, and wherein, after the coating, the main body is removed from the fluidized bed. The invention further relates to an axial-radial rolling bearing with the described rolling bearing cage.

9 Claims, 3 Drawing Sheets

(51) Int. Cl.

| | | |
|---|---|---|
| B05D 1/24 | (2006.01) | |
| F16C 33/56 | (2006.01) | |
| F16C 19/38 | (2006.01) | |
| F16C 43/04 | (2006.01) | |
| F16C 33/51 | (2006.01) | |
| B05D 3/02 | (2006.01) | |

(52) U.S. Cl.
CPC ........ *F16C 19/386* (2013.01); *F16C 33/4629* (2013.01); *F16C 33/565* (2013.01); *F16C 43/04* (2013.01); *B05D 3/0218* (2013.01); *F16C 33/513* (2013.01); *Y10T 29/49691* (2015.01)

(56) References Cited

U.S. PATENT DOCUMENTS

| | | | |
|---|---|---|---|
| 4,911,949 A | 3/1990 | Iwase et al. | |
| 7,252,436 B2* | 8/2007 | Yokota | F16C 33/4629 384/580 |
| 7,891,880 B2* | 2/2011 | Hofmann | F16C 19/26 384/523 |
| 2003/0012469 A1 | 1/2003 | Dittenhofer | |

FOREIGN PATENT DOCUMENTS

| | | |
|---|---|---|
| DE | 1915330 A1 | 10/1970 |
| DE | 3041355 A1 | 5/1981 |
| DE | 2358287 C3 | 11/1983 |
| DE | 19731892 A1 | 1/1999 |
| DE | 19751003 A1 | 3/1999 |
| DE | 202004007831 U1 | 7/2004 |
| DE | 102008053248 A1 | 4/2010 |
| FR | 1188894 A | 9/1959 |
| GB | 2062128 A | 5/1981 |
| JP | 2009115318 A | 5/2009 |
| WO | 2011003391 A1 | 1/2011 |

OTHER PUBLICATIONS

English Translation of International Search Report for International patent application No. PCT/EP2013/053948; mailing date Jun. 5, 2013.
English Abstract of Japanese patent No. JP2009115318A.
English Abstract of German patent No. DE1915330A1.
English Abstract of German patent application publication No. DE102008053248A1.
English Abstract of German patent No. DE19751003A1.
English Abstract of German patent No. DE1079901B.
English Abstract of German patent application publication No. DE202004007831U1.
English Abstract of counterpart U.S. Pat. No. 3,573,953A to German patent No. DE1577915A1. (Note: English Abstract of DE1577915A is not available.).
English Abstract of GB counterpart U.S. Pat. No. 2,062,128A to German patent No. DE3041355A1. (Note: English Abstract of DE3041355A1 is not available.).
English Abstract of German patent No. DE19731892A1.
English Abstract of GB counterpart publication No. GB1408975 to German patent application No. DE2358287C3. (Note: English Abstract of DE2358287C3 is not available.).
English Translation of International Preliminary Report on Patentability and Written Opinion of the International Searching Authority for PCT/EP2013/053948, mailed Sep. 12, 2014.
English language abstract of Japanese Patent No. JP 2002227845 A.
English language abstract of Japanese Patent No. JP 2002235752 A.
English language abstract of Japanese Patent No. JP 2011110464 A.
English language abstract of Japanese Patent No. JP 2004105949 A.
English language abstract of Japanese Patent No. JP H08192103 A.
English language abstract of Japanese Patent No. JP S6265775 A.
English language abstract of Japanese Patent No. JP 2007285352 A.
English language abstract of Japanese Patent No. JP 2011117487 A.

* cited by examiner

METHOD FOR PRODUCING A ROLLING BEARING CAGE FOR AN AXIAL-RADIAL ROLLING BEARING AND AXIAL-RADIAL ROLLING BEARING

CROSS REFERENCE TO RELATED APPLICATIONS

This application is a U.S. National Stage Entry of International Patent Application Serial Number PCT/EP2013/053948 filed Feb. 27, 2013, which claims priority to German patent application no. DE 102012101651.8, filed Feb. 29, 2012.

FIELD

The invention relates to a method for producing a rolling bearing cage for a rolling bearing which has at least one row of rolling bodies. The subject matter of the invention also encompasses a rolling bearing equipped with at least one such rolling bearing cage, the rolling bearing having an inner ring, an outer ring and the at least one row of rolling bodies in between.

BACKGROUND

The rolling bearing cage is provided for holding the rolling bodies in the form of rollers, that is to say in particular tapered rollers or cylindrical rollers, with a uniform spacing from one another. According to the prior art, corresponding cages may be in the form of an open or closed ring or formed from a multiplicity of segments.

It is known from practice for low cage forces in the case of small rolling bearings to be accommodated substantially without wear by means of plastics cages. In the case of large rolling bearings, the use of injection-molded plastics cages is firstly disadvantageous owing to the high costs for corresponding injection molds, in particular because large rolling bearings are normally also manufactured in relatively low unit quantities. Furthermore, in many cases, plastics cages for large rolling bearings do not exhibit adequate strength. Furthermore, it must be taken into consideration that, in particular in the case of tapered-roller bearings, the cages must also take the form of a section of the shell of a cone, and thus at least cannot readily be manufactured from a flat material.

Within the context of the present invention, it is the intention for the rolling bearing cage to be suitable in particular for large rolling bearings, such that the diameter of the cage is then at least one meter. At this size in particular, although cages can be manufactured inexpensively from simple plastics strips, they exhibit only very low strength in the circumferential direction and are thus not suitable for many applications. Here, it must also be taken into consideration that, specifically in the case of large rolling bearings, retroactive exchange of the bearing is, in part, associated with very high costs and very high outlay. High cage forces can be accommodated by cages composed of steel, wherein steel is sensitive to wear, in particular in the presence of poor lubrication. Additional measures such as nitriding or nitrocarburizing are expensive, as is the use of a high-grade metal with low wear characteristics, such as bronze.

DE 30 41 355 A1 discloses a cage for a conventional ball bearing with an inner raceway, an outer raceway and multiple balls arranged in between, wherein the cage is formed from two sheet-metal parts which each have a coating composed of plastic. The production of a cage of said type formed from two deformed and coated sheet-metal strips is cumbersome and is not suitable for large rolling bearings. Since the coating is initially applied to the punched parts in an electrostatic method or a flow bed method, transitions remain after the connection of the punched parts, at which transitions there can be an increased risk of damage. A thermoplastic, in particular polyamide, is provided as a coating for the purpose of reducing the areas of contact between the cage and the balls and protecting the inner and the outer raceway against wear and reducing the friction coefficient.

DE 197 51 003 A1 discloses a method and a device for coating workpieces with a powdery, granular, liquid or pasty coating medium, wherein the application of the coating medium is performed in a fluidized bed. Excess coating medium is removed before the final melting-on and adhesion to the workpiece. A cumbersome method procedure is thus required. The described method and the described device are provided in particular for endless workpieces which are then subsequently processed into their final shape.

WO 2011/003391 A1 discloses a cage for a rolling bearing, which cage can be manufactured in one piece from a solid material. The cage has deformation regions in order that the rolling bodies can initially be placed into the cage and then fixed after a deformation of the deformation regions. A coating of the cage is not described, and is also not possible because said coating would be destroyed as a result of the deformation of the deformation regions. Retroactive coating is also no longer possible owing to the rolling bodies that are then movably arranged within the cage.

DE 197 31 892 A1 generally describes the coating of an electrically conductive workpiece with a fluidized bed.

SUMMARY

The present invention is based on the problem of specifying a method for producing a rolling bearing cage, by means of which method an adequately strong but also more wear-resistant rolling bearing cage can be provided in a simple manner in particular even for large rolling bearings. It is furthermore sought to specify a rolling bearing, the rolling bearing cage of which is both inexpensive to produce and is also stable and durable.

BRIEF DESCRIPTION OF THE DRAWING

The present disclosure is described in detail below with reference to the attached drawing figures, wherein.

DETAILED DESCRIPTION

Figure 1:
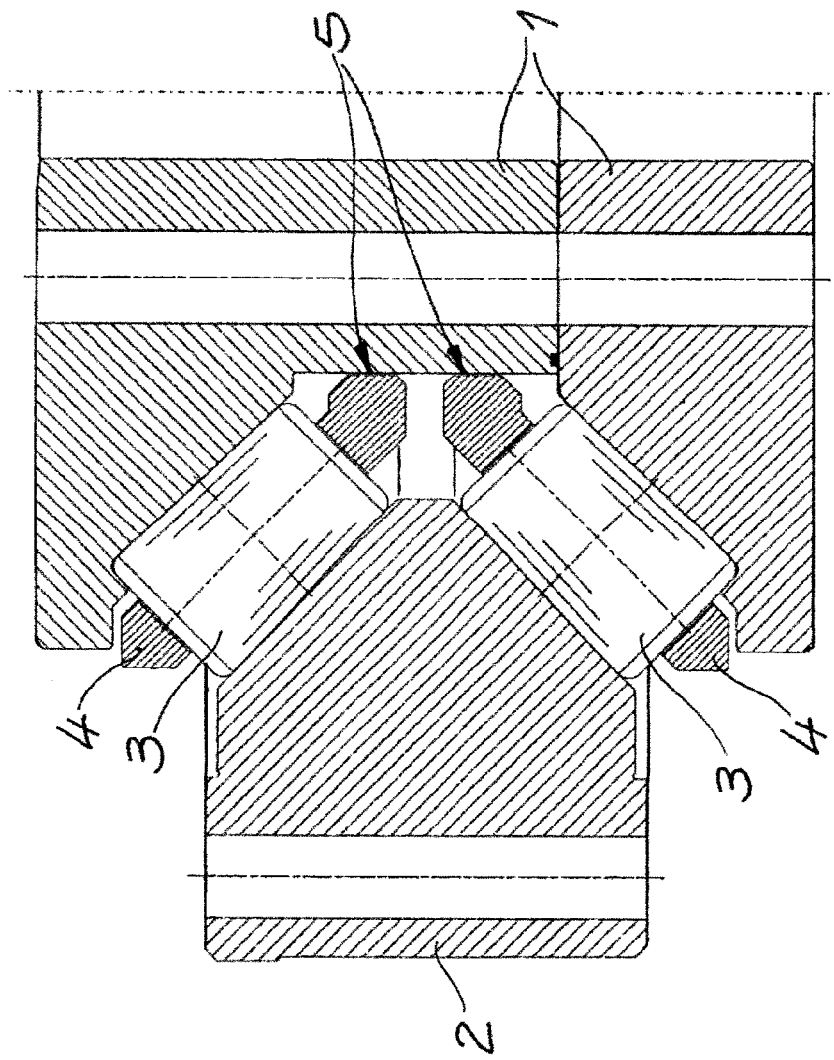
FIG. 1 is a side section view through an embodiment of an axial-radial rolling bearing of the present disclosure, showing two rows of tapered rollers, inner and outer rings, and rolling bearing cages.

To achieve said object, according to the invention, a method is provided for producing a rolling bearing cage for a rolling bearings. The rolling bearing has at least one row of rolling bodies. Within the context of the method, a ring or a ring segment composed of a metallic solid material, in particular of steel or aluminum, is or are provided. From the ring or the ring segments, by means of a deformation process and/or a cutting, material-removing process, a ring-shaped or segmented main body of the rolling bearing cage is formed which has openings for receiving in each case one rolling body.

The deformation process and/or the cutting, material-removing process are provided not only for forming the openings but also for defining the further form of the main body. Accordingly, for example, oblique contact surfaces may be formed that are suitable for contact with the inner ring or with the outer ring. Furthermore, during the formation of the main body, it is also possible for integrated chambers such as grease grooves to be formed on the rolling bearing cage, in which chambers lubricant can be accommodated in regions of the contact surfaces. Further means, such as bores for holding the main body during a subsequent coating process, may be generated.

As cutting, material-removing processes, use may be made in particular of milling, turning and drilling, which may also be used in combination. Cutting of a structure is furthermore possible by means of a thermal cutting process, for example by means of a laser.

Subsequently, in order to be thermally coated with a thermoplastic powder, the main body is heated and a temperature above a minimum coating temperature, wherein the main body is then immersed in a fluidized bed with the thermoplastic powder. While the main body is present in the fluidized bed, the plastic powder adheres to the main body and melts on, whereby a continuous coating is formed. Finally, the main body is removed from the fluidized bed after the coating process.

According to the invention, the main body is initially manufactured in its final shape before coating is then performed. After the removal of the main body from the fluidized bed, no further heating, deformation or the like is required, such that a highly uniform coating, which exhibits good adhesion at all locations, is generated over the entire ring.

Since the ring that forms the main body, or the ring segments that form the main body, are shaped from a solid material, it is also possible to realize very stable embodiments that can meet the demands on a large rolling bearing even under intense load.

Since, in the context of the invention, the main body for forming the rolling bearing cage is provided with a uniform coating, the openings of the main body for receiving rollers must have an oversize. Said oversize is dimensioned such that, even taking the coating into consideration, the rolling bodies can be accommodated without jamming but also with the least possible play.

The rolling bearing is preferably in the form of an axial-radial rolling bearing with at least two rows of rolling bodies, such that an inner ring and an outer ring are supported radially against one another and axially against one another regardless of the direction of the axial thrust forces. This means that all of the axial forces can be transmitted regardless of their direction (parallel or antiparallel).

The axial-radial rolling bearing may in particular be a two-row tapered-roller bearing with the oppositely inclined rows of tapered rollers, or else may be a three-row roller-type slewing joint. In the case of a roller-type slewing joint of said type, three rows of cylindrical rollers are provided as rolling bodies, of which a first and a third row provide axial support and a second row provides radial support. The second row is normally arranged between the first row and the third row.

Depending on the configuration of the axial-radial rolling bearing as a three-row roller-type slewing joint or two-row tapered-roller bearing, use is made of either cylindrical rollers or tapered rollers. The window-like openings correspondingly have a rectangular or trapezoidal outline for receiving the rollers. Even though the coating applied in the fluidized bed is highly uniform on planar sections of the main body, material accumulations can form in corners, in particular in the corners of the openings in the case of a rectangular or trapezoidal outline, which material accumulations can lead either to jamming with the rollers or, outside said corners, to considerable play. In a preferred refinement of the method according to the invention, in the case of a main body with window-like openings, it is therefore provided that, proceeding from a rectangular or trapezoidal outline, cutouts that extend beyond the respective outline are generated in the corners of the openings. In the corners there may for example be formed additional incisions or bores, wherein if a bore is generated, a circular segment shape is formed.

The main body formed from a ring or from ring segments may preferably be heated in an oven. Here, it must be taken into consideration that, owing to the provision of a solid material, it is necessary for an altogether relatively large amount of heat to be introduced.

Depending on the configuration of the main body as a ring or as ring segments, it is however also conceivable to implement inductive heating by means of an alternating electromagnetic field of an induction coil. In the case of a continuous ring, there is the advantage that even a large, coherent structure of said type can be heated. In the case of the main body in the form of a ring, the induction coil is preferably also of ring-shaped form and arranged concentrically with the ring. A concentric arrangement of the induction coil within or outside the ring yields a uniform gap, and thus particularly uniform heating.

Even if temperature losses during or after the heating should be kept as low as possible for energy efficiency reasons, it may be expedient within the context of the invention to provide an interval between the heating of the ring and the immersion in the fluidized bed, which interval serves to allow the temperature to homogenize.

Within the context of the invention, the selection of the temperature is of particular significance because, in the presence of an excessively low temperature, the powder that adheres to the main body in the fluidized bed can be melted on only to an inadequate extent. By contrast, in the presence of an excessively high temperature, there is the risk of the plastic becoming too runny, resulting in an uneven distribution of the coating owing to gravitational force. Finally, the temperature must be selected on the basis of the thermoplastic provided as a coating, wherein allowance must also be made for a degree of cooling during the coating process within the fluidized bed.

Within the context of the invention, the main body is formed by way of a deformation process and/or a cutting, material-removing process. Here, it must be taken into consideration that dirt can remain on the main body as a result of such a machining process. Furthermore, a surface structure specific to the machining process, with channels, grooves or non-uniformities, may be present, which under some circumstances impairs the subsequent coating with plastic. Against this background, provision is made, in a further method step after the deformation or machining process, for cleaning or some other surface treatment to be performed. What is particularly advantageous is the improvement of the surface by means of a particle jet, for example treatment by sandblasting or blasting with corundum. In the course of such a treatment step, dirt and superficial material defects can be eliminated. Furthermore, on the surface, a microstructure is generated which is particularly suitable for receiving a coating. Finally, strength and durability can be further improved by blasting the surface.

To improve the adhesion of the coating on the main body, the main body may be provided with an adhesion-promoting layer as primer before the coating process itself. Adhesion promoters based on organic solvents and synthetic polymers are particularly suitable, these preferably being applied before the heating process.

The invention also relates to an axial-radial rolling bearing.

The present disclosure will be further explained below on the basis of the drawings, which illustrate merely an exemplary embodiment.

FIG. 1 shows a section through one side of an axial-radial large rolling bearing, wherein the axial-radial large rolling bearing has an inner ring 1, an outer ring 2 and two rows of rolling bodies 3 arranged in between. The two rows of rolling bodies 3 are arranged opposite one another in the axial direction, such that the inner ring is supported relative to the outer ring 2 both radially and also axially, regardless of the direction of axial thrust forces.

It can be seen from the sectional illustration of FIG. 1 that the rolling bodies 3 in the form of tapered rollers for each of the two rows are held spaced apart from one another by a rolling bearing cage 4. Furthermore, the rolling bearing cages 4 also have contact surfaces 5 at which the rolling bearing cages 4 are supported in each case against the inner ring 1.

Figure 2:
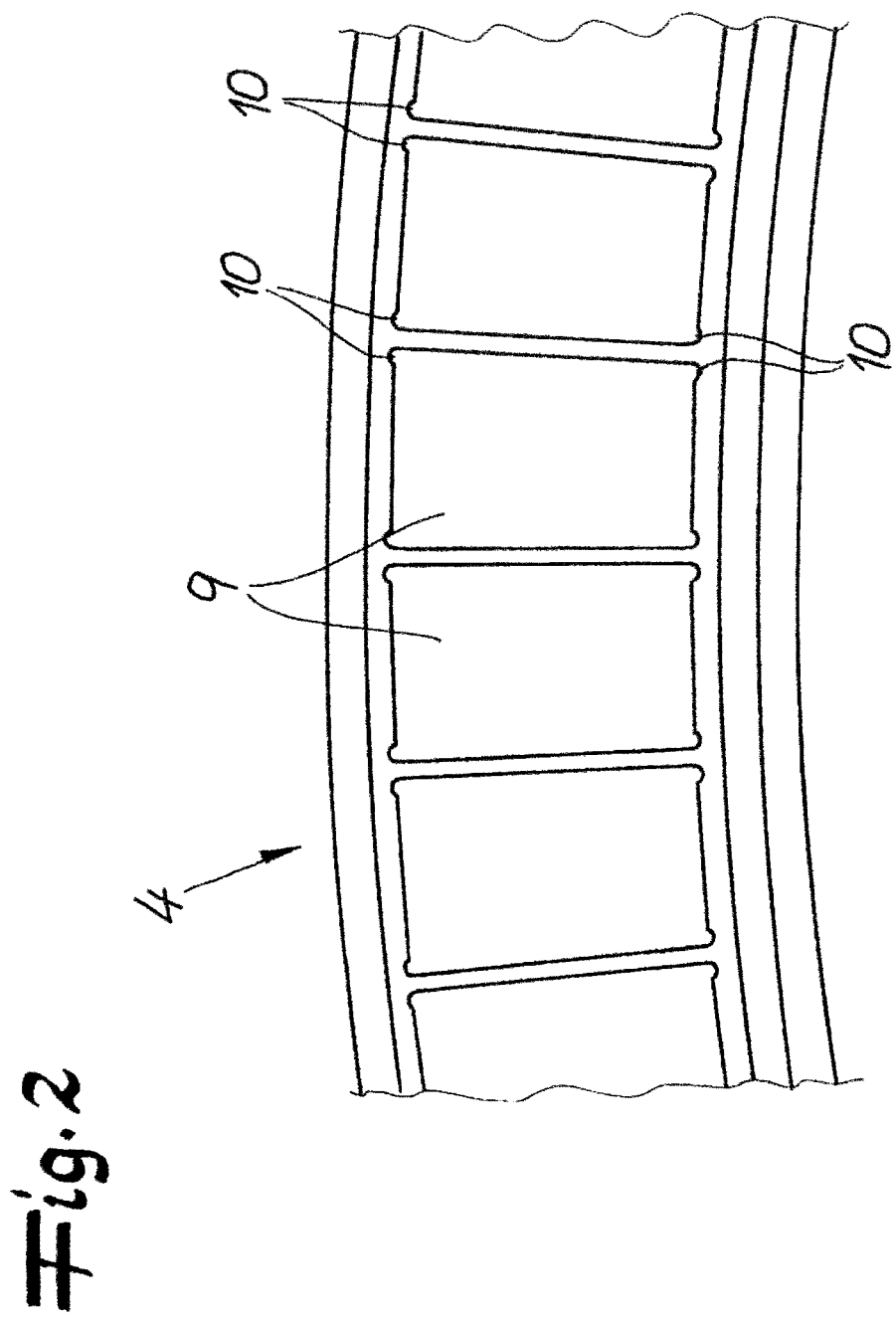
FIG. 2 is a perspective detail view of an embodiment of a rolling bearing cage of FIG. 1.
Figure 3:
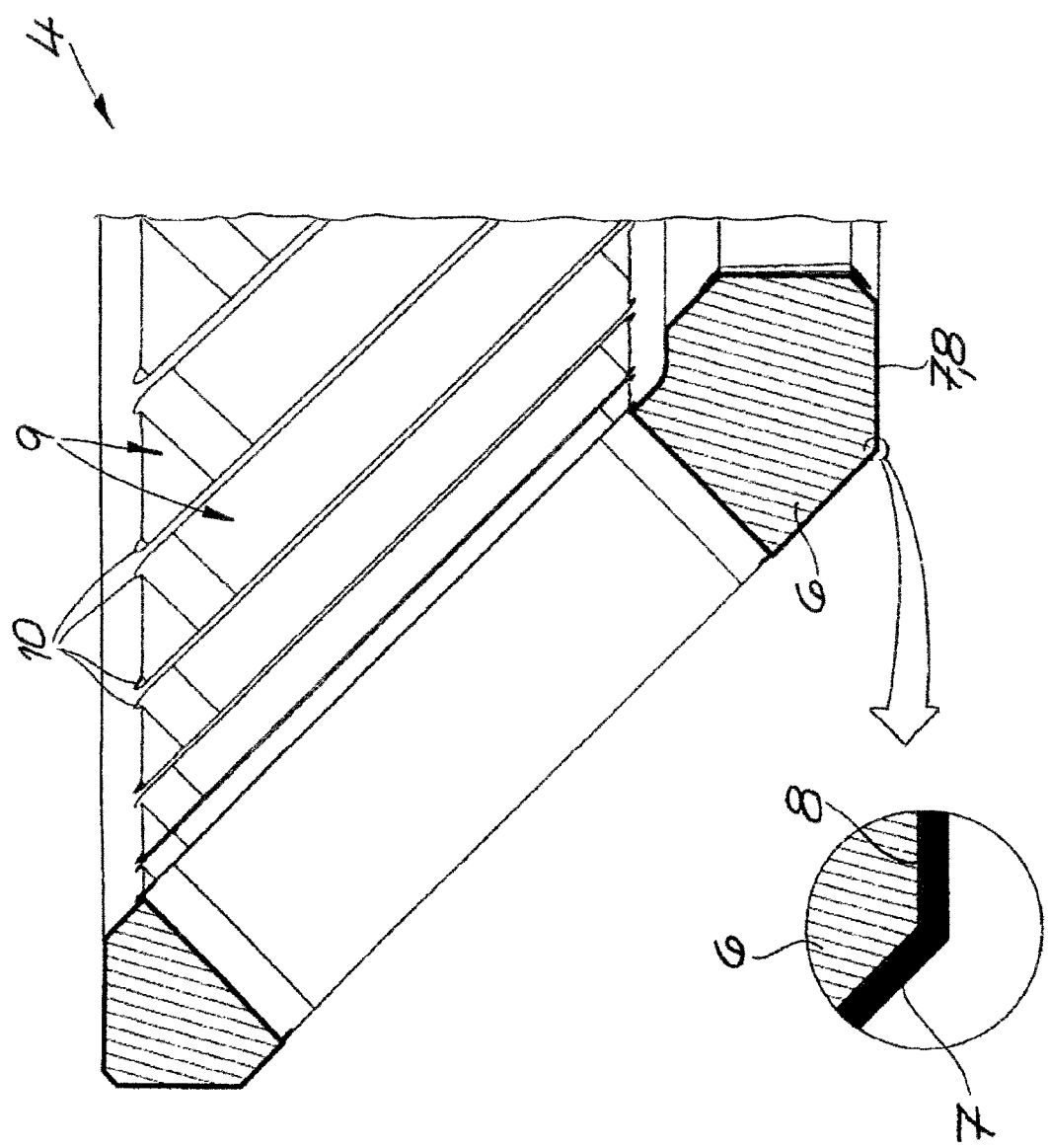
FIG. 3 is an isometric detail section view of an embodiment of a rolling bearing cage of FIG. 2.

In FIGS. 2 and 3, it is illustrated that the two rolling bearing cages 4 each have a stable main body 6 and an external coating 7 composed of a thermoplastic. To improve the adhesion of the coating 7 on the main body 6, a thin adhesion-promoting layer 8 is also provided as an intermediate layer.

The stable main body 6 is formed from a metallic solid material by way of a cutting, material-removing process, and may for example be milled from a solid ring. This yields the advantage that the main body 6 exhibits stability that is adequate even for a large rolling bearing. Furthermore, further contours can be generated as required during the production from the solid material. Accordingly, it can be seen in FIG. 2 that the openings 9 for receiving the tapered rollers as rolling bodies 3 have a substantially trapezoidal outline. In the corners of the openings 9, however, cutouts 10 are provided that extend beyond the outline. In the exemplary embodiment, additional bores are formed in the corners of the openings 9, such that said cutouts 10 have the form of circular segments.

The cutouts 10 are provided for preventing an accumulation of the coating 7 at the corners.

The coating 7 is preferably applied in a fluidized bed, with a highly uniform coating being formed. A material accumulation may however form in the corners of the openings 9 solely owing to the geometry, wherein owing to the additional cutouts 10, however, said material accumulation cannot lead to jamming with the rolling bodies 3.

While the main body 6 imparts a high degree of stability to the rolling bearing cage 4, the coating 7 generates a reduction in friction and provides effective protection against wear. Polyamide (PA) and polyether ketone, preferably polyether ether ketone (PEEK), with a layer thickness of between 0.4 mm and 1.3 mm are particularly suitable as coating 7.

The coating of the main body 6 is preferably performed in a fluidized bed, wherein the main body 6 is initially heated to a temperature suitable for the coating 7, at which temperature it is then subsequently the case that, in the fluidized bed, particles of a plastic powder adhere, melt on and form the continuous coating 7.

The invention claimed is:

1. A method for producing a rolling bearing cage for a rolling bearing having at least one row of rolling bodies, comprising:
    forming, from a ring of solid metallic material, a ring-shaped main body having a plurality of openings disposed therein that are each configured to receive one rolling body, said forming being performed by at least one of a deformation, cutting, or material-removing process;
    heating the ring-shaped main body to a temperature above a predetermined minimum coating temperature required to permit the main body to be coated with a thermoplastic powder;
    resting said heated ring-shaped main body for a predetermined interval of time after heating to permit the elevated temperature of the main body to homogenize throughout said main body, wherein the elevated temperature at an end of the resting interval of time is still above the minimum required coating temperature;
    immersing the heated ring-shaped main body in a fluidized bed containing thermoplastic powder so as to cause the thermoplastic powder in contact with the main body to melt and adhere to the main body so as to form a continuous coating thereon, wherein the immersing occurs after the heated ring-shaped main body is rested for the predetermined interval of time; and
    removing the coated ring-shaped main body from the fluidized bed.

2. The method of claim 1, wherein the plurality of openings are formed as window-like openings having at least one of a rectangular or trapezoidal outline for the purpose of receiving rollers as rolling bodies, and wherein the plurality of formed openings further include cutouts disposed at corners of the openings that extend beyond the respective outline.

3. The method of claim 2, wherein the cutouts are shaped as circular segments.

4. The method of claim 1, wherein said heating is performed by an oven.

5. The method of claim 1, further comprising moving said ring-shaped main body during at least one of said heating or immersing steps.

6. The method of claim 1, wherein the thermoplastic powder in the fluidized bed is comprised of at least one of a polyamide or a polyether ketone.

7. The method of claim 1, wherein the formed coating has a thickness of between about 0.4 mm and 1.3 mm.

8. The method of claim 1, further comprising treating the ring-shaped main body by blasting it with a particle jet prior to said immersing.

9. The method of claim 1, applying an adhesion-promoting layer to the formed ring-shaped main body prior to said immersing.

* * * * *